United States Patent [19]

Rosenfeld

[11] 4,232,555
[45] Nov. 11, 1980

[54] ULTRASONOGRAPHIC EXPOSURE APPARATUS

[75] Inventor: Robert B. Rosenfeld, Rochester, N.Y.

[73] Assignee: Eastman Kodak Company, Rochester, N.Y.

[21] Appl. No.: 30,972

[22] Filed: Apr. 18, 1979

[51] Int. Cl.³ ............................................. G01N 29/00
[52] U.S. Cl. .......................................... 73/606; 430/3
[58] Field of Search ..................... 73/603, 606; 430/3; 128/660; 367/7, 8

[56] References Cited

U.S. PATENT DOCUMENTS 3,861,199  1/1975  Barkhoudarian ..................... 73/606

FOREIGN PATENT DOCUMENTS 864089  8/1978  Belgium ................................. 73/606

2831782  2/1979  Fed. Rep. of Germany ............. 430/3

OTHER PUBLICATIONS

P. J. Ernst, "Ultrasonography," *Journal of the Acoustical Society of America*, vol. 22, No. 1, pp. 80-83, Jan. 1951.

*Primary Examiner*—Stephen A. Kreitman
*Attorney, Agent, or Firm*—Carl O. Thomas

[57] ABSTRACT

An ultrasonographic exposure apparatus is disclosed. An ultrasound transducer is positioned in a reservoir so that it is immersed in a transport liquid within the reservoir. An ultrasonographic element is positioned in contact with the transport liquid, and a damper is located to form an interface with the transport liquid adjacent the ultrasonographic element remote from the ultrasound transducer.

20 Claims, 2 Drawing Figures

ULTRASONOGRAPHIC EXPOSURE APPARATUS

FIELD OF THE INVENTION

This invention is directed to an improved apparatus for exposing an ultrasonographic element. More specifically, this invention is directed to improved sonographic cameras and sonographic sensitometers.

BACKGROUND OF THE INVENTION

The terms "ultrasonic radiation" and "ultrasound" are employed interchangeably in this specification to designate pressure-rarefaction waves differing from sound waves in exhibiting higher frequencies and shorter wavelengths. The term "ultrasonic exposure" is employed to designate exposure to ultrasonic radiation. The production of visible images by means of ultrasonic radiation is referred to in the art as "ultrasonoscopy". The production of a visible record by means of ultrasonic radiation is referred to as "ultrasonography". The instruments for producing ultrasonoscopic images are designated "ultrasonoscopes", and the ultrasonoscopes which produce ultrasonographic images are referred to as "sonographic cameras". Elements which form visible images of ultrasonic radiation patterns as a result of being ultrasonically exposed in a sonographic camera are referred to as "ultrasonographic elements". Instruments which are capable of permitting ultrasonographic elements to be concurrently exposed in different areas to different intensities of ultrasound are referred to as "sonographic sensitometers".

The definition of terms as here presented is believed to be generally consistent with the use of these terms in the art. Specifically, most of these terms are suggested by P. J. Ernst in the *Journal of the Accoustical Society of America*, Vol. 22, No. 1, in an article entitled "Ultrasonography", pp. 80-83, January 1951.

In Belgian Pat. No. 864,089, dated Aug. 17, 1978, there is disclosed a process for imagewise ultrasonically exposing a silver halide photographic element. In one form this process calls for immersing a silver halide photographic element in a transport liquid, such as a polar solvent, preferably water or an aqueous solution, and imagewise ultrasonically exposing the element to ultrasound. Either during or after ultrasound exposure the photographic element is exposed to light. The element is then photographically processed in a conventional way, and an ultrasonographic image is produced for viewing. Since the photographic element forms an ultrasonographic image, it is by definition an ultrasonographic element. It is generally preferred to allow ultrasonographic elements a brief period of contact with the transport liquid prior to ultrasonic exposure, and in some forms it is preferred to delay light exposure for a few seconds following ultrasound exposure.

In commonly assigned, copending patent application titled ULTRASOUND IMAGING OF INTERNALLY FOGGED SILVER HALIDE ELEMENTS, Ser. No. 3,571, filed Jan. 15, 1979, there are disclosed internally fogged silver halide emulsion layer containing elements useful a ultrasonographic elements. The process of ultrasonographic exposure disclosed therein differs from that of Belgian Pat. No. 864,089 in that no light exposure step is employed during or after ultrasound exposure in order to produce a viewable ultrasonographic image.

In commonly assigned, copending patent application titled ULTRASONIC IMAGING WITH CATALYTIC ELEMENTS, Ser. No. 8,910, filed Feb. 2, 1979, ultrasonographic elements are disclosed containing a catalyst layer. Ultrasonic exposure can be undertaken while the ultrasonographic element is in contact with a transport liquid containing a catalyst poison. Light exposure is not required for imaging.

In forming ultrasonographic images as described above, ultrasound which has passed through the ultrasonographic element being exposed can be reflected back to the element and result in nonuniformities in background areas and/or in loss of image definition. Further, the ultrasonographic elements are very susceptible to image degradation when an interval exists between ultrasound exposure and formation of a developable latent image. During the interval between sound and light exposures, for example, care must be exercised to avoid disturbances in the transport liquid. Still further, the composition of the transport liquid can vary in the course of sequential imaging due to diffusion into or out of the ultrasonographic elements.

SUMMARY OF THE INVENTION

The ultrasonographic exposure apparatus of this invention is capable of protecting an ultrasonographic element from nonuniformities and image degradation of the type described above. Specifically, this apparatus can reduce reflection of ultrasound which produces nonuniformities and degrades image definition. Additionally this apparatus can in one form protect the transport liquid adjacent the ultrasonographic element during exposure from image degrading disturbances. Further, this apparatus can facilitate more efficient control of the transport liquid composition. In a preferred form this invention is directed to an ultrasonographic exposure apparatus which substantially eliminates background nonuniformities and protects the ultrasonographic element from image degradation attributable to ultrasound reflections, transport liquid disturbances and variations in transport liquid composition. Other capabilities and advantages of this invention can be appreciated by reference to the detailed description of the ultrasonographic exposure apparatus.

In one aspect this invention is directed to an ultrasonographic exposure apparatus comprising a reservoir for a transport liquid. An ultrasound transducer is positioned to be immersed in the transport liquid. Means are provided for positioning an ultrasonographic element in contact with the transport liquid, and a damper is located adjacent a major surface of the ultrasonographic element remote from the ultrasound transducer to form an interface with the transport liquid within the reservoir.

DETAILED DESCRIPTION OF THE PREFERRED EMBODIMENTS

Figure 1:
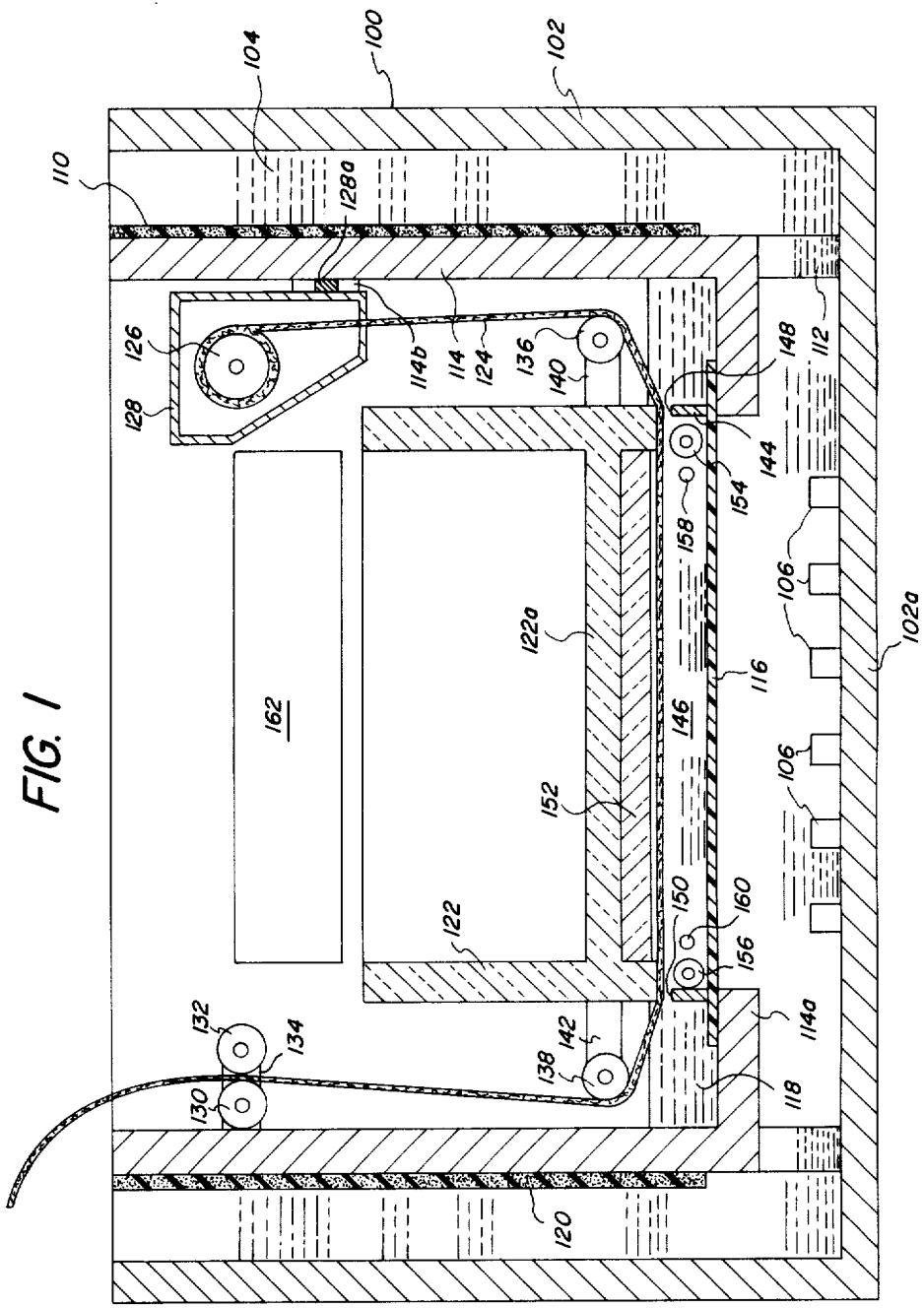
FIG. 1 is a sectional view of a sonographic sensitometer according to this invention.

In FIG. 1, a preferred sonographic sensitometer 100 according to the invention is illustrated. An outer reservoir 102 confines a first transport liquid 104. Adjacent the bottom wall 102A of the outer reservoir are positioned an array of ultrasonic transducers 106. The ultrasonic transducers can be of conventional construction and, by suitable connections to energy sources, not shown, can be made to emit continuous, modulated or pulsed ultrasonic radiation into the first transport liquid at selected intensities and frequencies. In a preferred form, the transducers are supplied with energy in a stepped relationship so that each transducer radiates ultrasonic energy at a predetermined multiple or fraction of that emitted by a next adjacent transducer. In this way, the transducers collectively form an array of ultrasonic radiation emitters which vary in a predetermined manner in their intensity of emission.

Located within the outer reservoir is an ultrasound reception unit 110. The unit is positioned by supports 112 in a fixed spatial relationship to the outer reservoir and the ultrasonic transducers. The ultrasound reception unit includes rigid barrier walls 114 which turn inwardly at their lower edges to form an integral flange 114A. The flange, together with a flexible membrane 116 sealed to the upper surface of the flange, form an inner or second reservoir for a second transport liquid 118. The barrier walls are provided with an outer covering 120 of a sound-absorbing material. The flexible membrane is formed of a liquid-impermeable, ultrasonically transmissive material.

A damper unit 122 is positioned in contact with the second transport liquid. Ultrasonographic element 124 to be ultrasonically exposed is interposed between the second reservoir and the damper unit in contact with the second transport liquid. The ultrasonographic element is pulled from a supply spool 126 rotatably mounted in a light-tight box 128 by a pair of drive rolls 130 and 132 rotatably attached to the second reservoir by mounting bracket 134. The light-tight box includes a lug 128A which cooperates with a bayonet slot 114B on the inner surface of the adjacent barrier wall to mount the box removably in position. Identical guide rolls 136 and 138 are rotatably attached to the damper unit by mounting brackets 140 and 142, respectively. One or both of the drive rolls can be driven by a motor or other drive mechanism, not shown, while the supply spool can be constructed to provide enough frictional drag for the ultrasonographic element to remain taut. In one preferred form, the ultrasonographic element can be provided along one or both edges with apertures to permit sprocket feed of the element.

A peripheral skirt 144 supports the damper unit in fixed spatial relation with the second reservoir. The skirt, together with the bottom walls of the damper unit and the second reservoir, forms an exposure chamber 146 for the ultrasonographic element. The skirt is provided with guide slots 148 and 150 to permit the ultrasonographic element to be drawn through the exposure chamber. Within the exposure chamber, the damper unit provides an ultrasound absorptive layer 152 in contact with its bottom wall 122A. To seal the exposure chamber adjacent to the guide slots, pressure-expansible bladders 154 and 156 are provided connected to fluid conduits, not shown, extending through the skirt. To permit selective circulation of the transport liquid within the exposure chamber, ports 158 and 160 are provided, which can be connected through the skirt to liquid conduits, not shown. At least the bottom wall and the ultrasound absorptive layer of the damper unit are capable of transmitting light when the ultrasonographic element is of a type which requires light exposure. They can be translucent, but are preferably substantially transparent. A light source 162 is positioned above the damper unit.

The sonographic sensitometer 100 can be used to establish an ultrasonographic characteristic curve for a ultrasonographic element. As discussed in Belgian Pat. No. 864,089, cited above, an ultrasonographic characteristic curve is a plot of intensity of ultrasound exposure versus density in ultrasonically exposed areas. The sensitometer permits exposure of the ultrasonographic element to a number of different ultrasonic intensity levels in a single process step.

Where the support of the ultrasonographic element being employed in the sensitometer does not appreciably absorb ultrasonic energy, the ultrasound-responsive layer or layers of the element can be positioned on the surface of the support nearest or farthest from the ultrasonic transducers. It is preferred that the ultrasound-responsive surface of the ultrasonographic elements be positioned nearest the ultrasonic transducers.

The advantages of the sonographic sensitometer 100 can be illustrated by describing its use with reference to the ultrasonographic element 124 in the form of an ultrasonographic film having a single ultrasound-responsive layer coated on a single major surface thereof. Where the ultrasonographic element is also light-responsive, the entire procedure until processing is completed, except for the light exposure step, if any, is conducted in the dark.

The first transport liquid 104 of any convenient composition is introduced into the outer reservoir 102. The ultrasound reception unit 110 is next prepared for use by introducing a second transport liquid into the second reservoir to form the second transport liquid 118. The ultrasonographic element with an ultrasound-responsive layer on the surface remote from the damper unit 122 is fed from the supply spool 126, over the guide roll 136, through the guide slots 148 and 150, over the guide roll 138 and between the drive rolls 130 and 132. The apparatus is now ready for use substantially as shown in FIG. 1.

The drive rolls are activated to bring a length of the ultrasonographic element not previously in contact with the second transport liquid into the exposure chamber 146. The expansible bladders 154 and 156 are then inflated substantially to seal the exposure chamber. The bladders press against the ultrasonographic element, causing it to lie against the surface of the ultrasound absorptive layer 152. This fixes the element securely in the desired plane for ultrasound exposure. The element can be allowed to remain in contact with the second transport liquid in the exposure chamber for a short period prior to exposure, as has been described in connection with this process, or the element can be imagewise ultrasonically exposed without delay after being positioned as described within the exposure chamber.

During ultrasound exposure, the ultrasonic transducers 106 each transmit ultrasonic energy into the first transport liquid, through the ultrasonically transmissive membrane 116 forming the lower wall of the second reservoir, through the second transport liqiuid in the exposure chamber and to the ultrasound-responsive layer of the ultrasonographic element. Each transducer emits ultrasound at a different level of intensity, and ultrasound is received at different intensity levels in differing areas of the ultrasonographic element. Light exposure of the ultrasonographic element can occur during or after ultrasound exposure. Light travels from the light source 162 through the bottom wall 122A of the damper unit and the ultrasound-absorptive layer 152.

During ultrasound exposure, it is desired to expose the ultrasonographic element to ultrasound transmitted from the transducers 106 through the transport liquid 104, the membrane 116 and the transport liquid in the exposure chamber 146 while protecting the element from exposure by ultrasound which has passed through the element and then been reflected back. The damper unit 122 protects the ultrasonographic element from such reflected ultrasonic energy. If the ultrasonographic element is clamped into the position shown for exposure, but with the damper unit omitted, the second transport liquid 118 forms an interface with air behind the ultrasonographic element. That is, the ultrasonographic element is interposed in the second transport liquid between the air-liquid interface and the ultrasonic transducers. Ultrasound passing through the ultrasonographic element causes a wave pattern to form at the surface of the second transport liquid behind the element. Ultrasonic energy reflected back from the air-liquid interface bearing the wave pattern produces background nonuniformities in the ultrasonographic pattern produced in the ultrasonographic element. With the damper unit interposed between the second transport liquid and ambient air, a wave pattern is prevented from forming behind the ultrasonographic element during ultrasound exposure. This greatly enhances the definition of the transmitted ultrasound pattern by the ultrasonographic element.

The ultrasound absorptive layer 152, though not necessary to avoid wave formation, offers further protection against ultrasound reflection from the bottom wall of the damper unit. The ultrasound-absorptive layer is analogous to a photographic antihalation layer. This layer can, in fact, be located on the surface of the ultrasonographic element remote from the ultrasound transducers and actually form a part of the ultrasonographic element being exposed. However, the ultrasound-absorptive layer, though advantageous, is not an essential feature in either the apparatus or the ultrasonographic element.

Where the ultrasonographic element is a silver halide photographic element, the ultrasonic exposure of the ultrasonographic element is preferably at an intensity below that required to form a latent image in the silver halide emulsion layer. The ultrasound exposure merely alters the sensitivity of the silver halide emulsion layer to light exposure. After ultrasonic exposure has occurred and before light exposure has formed a latent image in the photographic element, image definition can be degraded by even small disturbances in the transport liquid in contact with the photograhic element. Disturbance of the second transport liquid is greatly reduced by its restriction within the exposure chamber. To protect the exposure chamber further from disturbances, the first container acts as a shock absorber. In actual use, it has been shown that a shock or blow delivered to the first container is substantially entirely dissipated in the first transport liquid even when the outer covering 120 is omitted. The outer covering, however, provides additional protection. Once the developable latent image is formed in the silver halide emulsion layer of the photographic element, the element can be thereafter handled in accordance with conventional photographic processing techniques, and is not susceptible to degradation or obliteration under ordinary conditions of handling.

Depending upon the specific choices of transport liquid and ultrasonographic element, diffusion of a sensitivity altering material can occur in the exposure chamber from the ultrasound-responsive layer of the ultrasonographic element into a polar solvent forming the second transport liquid or from the polar solvent into the ultrasound-responsive layer. Diffusion into or out of the ultrasonographic element occurs at least during ultrasonic exposure and may occur also before and/or after ultrasonic exposure. In any case, the composition of the polar solvent within the exposure chamber is at least slightly altered as a result of this diffusion. Changes in the composition of the second transport liquid reservoir can lead to variations in the ultrasonographic exposure patterns being produced.

Before the expansible bladders are deflated to permit the ultrasonographic element to be drawn from the exposure chamber, the polar solvent in the exposure chamber is displaced by fresh polar solvent using the ports 158 and 160. Because of the relatively restricted volume of the exposure chamber, this can be accomplished very quickly. The small amount of liquid withdrawn from the exposure chamber can either be processed to its original composition and returned to the second transport liquid, or else simply discarded.

Figure 2:
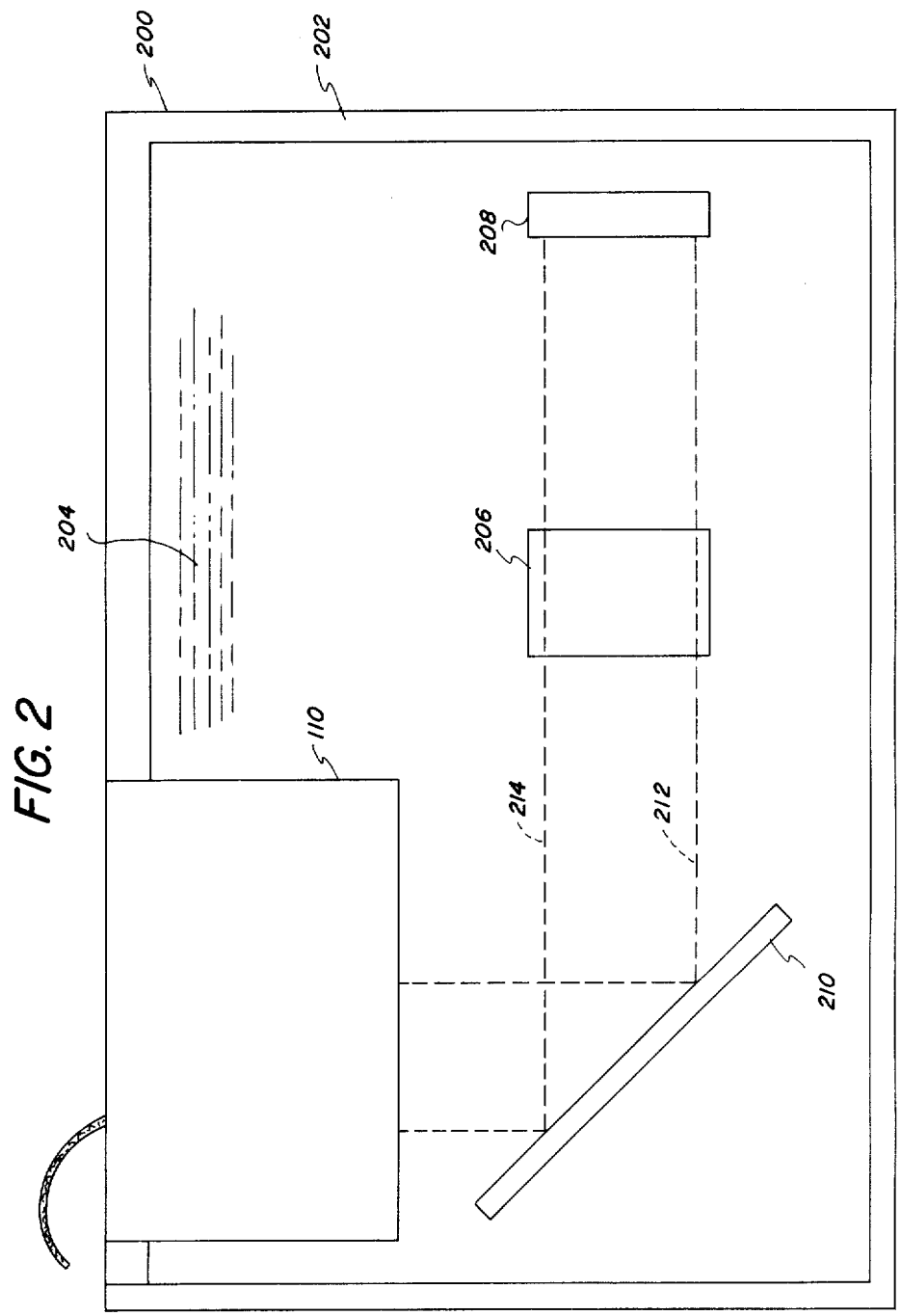
FIG. 2 is a schematic sectional view of a sonographic camera.

In FIG. 2, a sonographic camera 200 is shown. The camera includes a reservoir 202 confining a transport liquid 204 which can be identical to the first transport liquid 104. Contained within the reservoir is an object 206 intended to modulate or imagewise configure ultrasonic energy emanating from ultrasonic transducer 208. The object, of course, is the subject and not itself a part of the ultrasonic camera. An ultrasonic mirror 210 (such as a polished metal plate) is positioned in the reservoir. As indicated by dashed lines 212 and 214, which schematically illustrate ultrasound propagation paths, the ultrasonic mirror is positioned to reflect ultrasound so that it impinges upon the ultrasonic reception unit 110. The ultrasonic reception unit is operated identically as in the ultrasonic sensitometer 100, described above.

Although the preferred sonographic sensitometer and camera have been described with reference to specific embodiments, it will be appreciated that the advantages of this preferred apparatus can be achieved at least in part when the structure of the specific embodiments is varied. For example, referring to the sonographic sensitometer, when the ultrasonic transducers 106 are positioned in the exposure chamber 146, it is apparent that the outer reservoir 102 and the first transport liquid 104 can be eliminated. In another variant form, the second reservoir is omitted. The first and second transport liquids in this variant form are merged, and no separate exposure chamber exists; however, the damper unit remains in place and continues to protect the ultrasonographic element from reflected ultrasonic energy and to prevent a wave pattern from forming at the surface of the transport liquid behind the ultrasonographic element.

The ultrasound reception unit, when present in the sonographic camera, is subject to similar modifications as those described above, although the ultrasonic transducers generally would not be located in the reception unit. The use of an ultrasonic mirror in the sonographic camera is not required. The object and ultrasonic transducer 208 can be relocated so that no reflection of ultrasound is required to impinge ultrasound on the reception unit. For example, the ultrasound reception unit can be positioned to intercept ultrasound which is reflected rather than transmitted by the object. Although a comparatively simple sonographic camera configuration has been illustrated, it is appreciated that sonographic camera configurations can be employed using a variety of ultrasonic mirror and ultrasonic lens arrangements heretofore known for use in sonographic cameras and ultrasonoscopes.

The light source can be integrated with the damper unit so that one unit performs both functions. It is also possible to reposition the light source so that the ultrasonographic element is both ultrasonically and light-exposed from the same side. In still another variant form, the light source need not form a part of the apparatus at all. Its function can be performed by a separate light source, or ambient light can be relied upon for latent image formation. Further, certain ultrasonographic elements useful with this apparatus require no light exposure for ultrasonic imaging.

Although the apparatus has been described by reference specifically to light exposure, it is appreciated that electromagnetic radiation of a wavelength longer than that of the visible spectrum—e.g., infrared radiation can be employed as well as that of a wavelength shorter than the visible spectrum—e.g., ultraviolet and X-ray radiation, depending upon the spectral response to the particular ultrasonographic element being employed.

Although this apparatus is shown in a form particularly adapted to feed an ultrasonographic film, it is appreciated that this apparatus can be adapted without the exercise of invention to the exposure of elements in the form of discrete sheets or strips. The drive rolls 130 and 132, in addition to advancing the ultrasonographic element, can be used to laminate a receiver to the ultrasonographic element to produce a transferred image. For example, when the ultrasonographic element is a silver halide photographic element, the receiver can contain a developing agent and an alkali which are activated by a polar solvent ingested in the photographic element during transport through the exposure chamber. Photograhic processing then begins immediately upon laminating the receiver to the ultrasonographic element. Alternatively, the alkali can be incorporated in the polar solvent in the second transport liquid, which then becomes an activator bath. In still another form, the second transport liquid can be a photographic developer bath. Other variations will readily occur to those of ordinary skill in the art in view of this disclosure.

Neither the specific choice of ultrasonographic elements and transport liquids nor the process steps to be employed for producing a visible image following ultrasonic and, optionally, light exposures form a part of this invention. The materials and procedures for ultrasonographic imaging are more specifically disclosed in Belgian Pat. No. 864,089 and copending commonly-assigned patent application Ser. Nos. 03,571 and 8,910, each cited above and here incorporated by reference. In addition, the disclosure of concurrently filed, commonly-assigned patent application Ser. No. 031,083, entitled "An Improvement in Ultrasonography", is here incorporated by reference.

To provide a specific illustration of this invention and its use, the ultrasonographic element to be exposed can be a silver halide photographic element consisting of a silver bromide emulsion layer coated on a poly(ethylene terephthalate) film support. The emulsion layer contains cubic silver bromide grains of 0.2 micron mean diameter, gelatin and a 1,1'-diethyl-6,6'-dinitrothiacyanine in a concentration of $1.25 \times 10^{-4}$ mole per mole of silver. The emulsion layer is adjusted to a pAg of 6.0 with bromide ions by conventional techniques to substantially desensitize the emulsion layer to light prior to ultrasound exposure. The transport liquid 104 and 118 can both contain distilled water. The light source 162 can take the form of an array of 132 tungsten lamps of one and one-half watt each (commercially available under the trademark of GE 31) equally spaced on a polished metal reflecting surface contained within a housing 10 by 40 cm on an edge. Six ultrasound transducers 106 can be employed in the sonographic sensitometer capable of yielding a power output at the plane of the ultrasonographic element of 35, 8.7, 2.2, 1.0, 0.33 and 0.125 watts/cm$^2$, respectively. The ultrasonographic element can be immersed in the transport liquid in the exposure chamber 146 for 10 seconds before ultrasonic exposure and then imagewise exposed to pulsed ultrasound from the transducer (pulse width $10^{-6}$ second, pulse period $10^{-4}$ second and total number of pulses $10^5$) and then immediately exposed to light from the light source for 8 seconds. The ultrasonographic element, when then removed from the sonographic sensitometer, developed in Kodak Developer D-19, fixed, washed and dried (a conventional photographic processing sequence), produces an array of dark silver areas on a light background, which reflect differences in the intensity levels of the ultrasonic transducers. The maximum density levels produced in ultrasonically exposed areas can then be plotted as a function of ultrasonic exposure intensity to produce an ultrasonographic characteristic curve. This can be used to identify optimum ultrasonic power level required at the film plane for ultrasonographic imaging. Thereafter, the ultrasound reception unit can be identically used in the sonographic camera 200 for producing an ultrasonographic image of an object.

The foregoing discussion is considered sufficiently complete to permit those familar with the photographic and ultrasonic arts to practice the invention. To the extent that specific details and variants of the invention and means for its practice are not explicitly discussed, they can be appreciated by reference to the photographic and ultrasonographic arts. The invention has been described in detail with particular reference to preferred embodiments thereof, but it will be understood that variations and modifications can be effected within the spirit and scope of the invention.

What is claimed is

1. An ultrasonographic exposure apparatus comprising
   a reservoir for an ultrasonic transport liquid,
   an ultrasound transducer positioned to be immersed in the transport liquid,
   means for supporting an ultrasonographic element within the transport liquid, and
   a damper located adjacent the ultrasonographic element remote from the ultrasound transducer to form an interface with the transport liquid within said reservoir.

2. An ultrasonographic exposure apparatus according to claim 1 additionally including means cooperating with said damper to form an exposure chamber containing the ultrasonographic element and a portion of the transport liquid.

3. An ultrasonographic exposure apparatus according to claim 1 additionally including means interposed between said damper and the ultrasonographic element for absorbing ultrasound.

4. An ultrasonographic exposure apparatus according to claim 1 additionally including means for exposing the ultrasonographic element to electromagnetic radiation.

5. An ultrasonographic exposure apparatus according to claim 1 additionally including a plurality of spaced apart ultrasound transducers positioned to be immersed in the transport liquid and spaced from the ultrasonographic element.

6. An ultrasonographic exposure apparatus according to claim 1 wherein said means for supporting said ultrasonographic element includes means for transporting the ultrasonographic element into and out of position for ultrasonic exposure.

7. An ultrasonographic exposure apparatus comprising
a first reservoir for a first transport liquid,
an ultrasound transducer positioned to be immersed in the first transport liquid, and
an ultrasound reception unit positioned in contact with the first transport liquid to receive ultrasound from said transducer, comprising
  means forming a second reservoir for a second transport liquid including ultrasonically transmissive means forming at least one wall portion of said second reservoir,
  means for supporting an ultrasonographic element within said second reservoir adjacent said ultrasonically transmissive means,
  a damper located to form an interface with the second transport liquid adjacent a major surface of the ultrasonographic element remote from said transmissive means, and
  means cooperating with said second reservoir forming means and said damper to form an exposure chamber within the second transport liquid.

8. An ultrasonographic exposure apparatus according to claim 7 additionally including means interposed between said damper and the ultrasonographic element for absorbing ultrasound.

9. An ultrasonographic exposure apparatus according to claim 7 additionally including means for exposing the ultrasonographic element within the exposure chamber to light.

10. An ultrasonographic exposure apparatus according to claim 7 wherein said means for supporting the ultrasonographic element includes means for transporting the ultrasonographic element into and out of the exposure chamber.

11. An ultrasonographic exposure apparatus according to claim 10 additionally including means for selectively restricting flow of transport liquid into or out of the exposure chamber.

12. An ultrasonographic exposure apparatus according to claim 7 additionally including an ultrasonic mirror for reflecting ultrasound received from said ultrasound transducer to said ultrasound reception unit.

13. An ultrasonographic exposure apparatus according to claim 7 additionally including means for permitting selective replenishment of the transport liquid in the exposure chamber.

14. An ultrasonographic exposure apparatus comprising
a first reservoir for a first transport liquid,
an ultrasound transducer positioned to be immersed in the first transport liquid, and
an ultrasound reception unit positioned in contact with the first transport liquid to receive ultrasound from said transducer, comprising
  a second reservoir for a second transport liquid including rigid walls cooperating with a flexible, ultrasound transmissive membrane forming at least a portion of a bottom wall of said second reservoir,
  a damper partially immersed in the second transport liquid positioned above a separate ultrasonographic element to be exposed which is, in turn, positioned above said ultrasound transmissive membrane,
  an ultrasound absorptive layer interposed between the ultrasonographic element and said damper, and
  means for controlling the flow of the second transport liquid in contact with the ultrasonographic element adjacent said ultrasound transmissive membrane.

15. An ultrasonographic exposure apparatus according to claim 14 wherein at least a portion of the damper overlying the ultrasonographic element is light-transmissive, and additionally including means for light-exposing the ultrasonographic element through said damper.

16. An ultrasonographic exposure apparatus according to claim 14 wherein said means for controlling the flow of the second transport liquid includes a skirt cooperating with said damper and said second reservoir having slots formed therein for permitting the ultrasonographic element to be introduced and removed from between said damper and said membrane, ports formed in the skirt for permitting the second transport liquid to be selectively circulated and expansible means for selectively restricting flow of the second transport liquid through the slots.

17. An ultrasonographic exposure apparatus according to claim 14 additionally including sound absorption means positioned on said rigid walls.

18. An ultrasonographic exposure apparatus according to claim 14 in which said ultrasound transducer is laterally spaced from a plurality of additional ultrasound transducers capable of emitting ultrasonic radiation at differing levels of intensity.

19. An ultrasonographic exposure apparatus according to claim 14 additionally including means for reflecting ultrasound to said ultrasound reception unit.

20. An ultrasonographic exposure apparatus according to claim 19 in which an imaging object can be positioned between said ultrasound transducer and said reflecting means.

* * * * *